US005737548A

United States Patent [19]
Yach et al.

[11] Patent Number: 5,737,548
[45] Date of Patent: Apr. 7, 1998

[54] RISC-BASED MICROCONTROLLER WITH PERIPHERAL FUNCTION ADDED TO A SPLIT DATA BUS

[76] Inventors: Randy L. Yach, 16238 S. 25th St., Phoenix, Ariz. 85048; Ray Allen, 1331 W. Baseline #157, Mesa, Ariz. 85202

[21] Appl. No.: 554,741

[22] Filed: Nov. 7, 1995

[51] Int. Cl.$^6$ .................................................. G06F 13/00
[52] U.S. Cl. ........................ 395/308; 395/800; 395/559
[58] Field of Search ............................. 364/232.8, 240; 395/800, 306, 308, 309, 310, 555, 559

[56] References Cited

U.S. PATENT DOCUMENTS

| | | | |
|---|---|---|---|
| 4,835,684 | 5/1989 | Kanai | 364/200 |
| 5,175,841 | 12/1992 | Magar et al. | 395/425 |
| 5,294,928 | 3/1994 | Cooper et al. | 341/142 |
| 5,422,807 | 6/1995 | Mitra et al. | 364/184 |
| 5,454,114 | 9/1995 | Yach et al. | 395/750 |
| 5,581,792 | 12/1996 | Caudel et al. | 395/872 |

*Primary Examiner*—Dennis M. Butler
*Attorney, Agent, or Firm*—Matthew G. Reeves

[57] ABSTRACT

A RISC-based microcontroller is described which uses "split" data buses in the functional areas of the ALU and the I/O peripheral control interface. Also, the "Harvard" architecture is applied with separate buses for instructions and operational data which are stored and supplied from separate memories, i.e., an instruction memory and a data memory. This architecture allows to run the microcontroller with timing and clocking schemes of higher frequencies resulting in faster speed and higher processing rates in MIPS. The different functional components of the microcontroller can be placed on a single VLSI chip while other designs with much less on-chip functions are also conceivable.

8 Claims, 12 Drawing Sheets

```
RAM_control : block
begin
        process (CLK, skip_current, write_ext)
        begin
                if (skip_current + "0") and (write_ext = "1") and (CLK = "1") then
                        nWR_dummy < = "0";
                else
                        nWR_dummy < = "1";
                end if;
        end process:

-- create the following timing:
--
--                              read            write
-- phase            1       2       3       4
--
-- CLK                    ‾‾‾\___________/‾‾‾‾‾‾‾‾‾\___
--
-- delayed_CLK      ‾‾‾‾‾‾‾‾‾\___________/‾‾‾‾‾‾‾‾‾\__   (pulses are for precharge)
--
-- nCE              ‾‾‾‾\___/‾‾‾‾‾‾‾‾‾‾‾‾‾‾‾‾‾\___/‾‾
--
-- nOE              ‾‾‾‾‾‾‾‾\___________/‾‾‾‾‾‾‾‾‾‾‾‾‾
--
-- RCSen            ____/‾‾‾‾‾‾‾‾‾\___________/‾‾‾‾‾‾   (low = write to RAM)
--
process (CLK, delayed_CLK_dummy)
begin
        if (CLK = "0") and (delayed_CLK_dummy = "1") then
                -- phase 1: precharge, disable RAM and PIC driver
                nCE < = "1";
                nOE < = "1";
                ROBen < = "1";
        elsif (CLK = "0") and (delayed_CLK_dummy = "0") then
                -- phase 2: read RAM data, RAM drives ROB
                nCE < = "0";
                nOE < = "0";
                ROBen < = "1";
        elsif (CLK = "1") and (delayed_CLK_dummy = "0") then
                -- phase 3: disable RAM and PIC driver
                nCE < = "0";
                nOE < = "1";
                ROBen < = "1";
        else
                -- phase 4: write to RAM, PIC drives ROB
                                nCE < = "0";
                                nOE < = "1";
                                ROBen < = "0";
                end if;
        end process;
        end block RAM_control;
end behavior;
```

FIG. 7

RISC-BASED MICROCONTROLLER WITH PERIPHERAL FUNCTION ADDED TO A SPLIT DATA BUS

The invention relates to microcontrollers with RISC (=reduced instruction set calculation) architecture having peripheral functions such as A/D (analog/digital) conversion added to a split data bus of the microcontroller. Preferably, the device is manufactured in VLSI (=very large semiconductor integration technology).

BACKGROUND AND PRIOR ART

Microcontrollers are well-known in the art. In recent years they have evolved into complex apparatus and machines which require fast real-time control capability. Because of the rapid development in the VLSI field, the devices tend to become more and more single chip microcontroller modules in which all or nearly all functions including I/O (input/output) controls are embedded on the same chip. Microcontrollers are used in a wide diversity of present-day applications, with new applications found almost daily.

Today, microcontrollers are commercially manufactured and available in a great variety of designs. An exemplary microcontroller family is manufactured and marketed by Microchip Technology Inc. of Chandler, Ariz. to which company this application is assigned. It is, for example, the PIC16CXX family of CMOS (Complementary Metal-Oxide-Silicon) EPROM-based microcontrollers (EPROM= Electrically Programmable Read-Only Memory). These microcontrollers are described in the "PIC16/17 Microcontroller Data Book 1995/96" of Microchip Technology Inc., Chandler, Ariz. USA, which is incorporated herein by reference.

In the broad spectrum of microcontroller designs one will find single chip microcontroller modules which comprise nearly all functions around the ALU (Arithmetic/Logical Unit) or CPU (Central Processing Unit) at the one extreme or only a minimum of such functions at the other extreme. In a high level of device integration, a single chip VLSI microcontroller module may have functions integrated such as EPROM instruction memory, general purpose registers, special function registers, hardware stack, external/internal interrupts, I/O peripheral controls, timer and clock circuitry, synchronous/asynchronous receiver-transmitter controls, baud rate generators, watchdog timer with its own on-chip RC oscillator, power-saving sleep mode, power-up timer, power-on reset circuitry, on-chip oscillator start-up timer, fuse selector oscillator options, fusible code protection, etc.

The other extreme is a minimum of on-chip functions as is the case, for example, in the microcontroller module described in the article "VHDL-Entwurf eines 8-Bit-Prozessor-Makros" (VHDL Design of an 8-bit Processor Macro) by T. Büchner, G. Roos, T. Schwederski and V. Wahl in the journal Elektronik 3/1994, pages 55–61.

It is, of course, within the discretion of an engineer who has to design a microcontroller to choose an implementation of the microcontroller circuitry somewhere between these extremes. In his decision he will be guided by certain boundary conditions resulting from different circumstances and conditions imposed by the specific objectives which ultimately must be achieved with the apparatus or machine under design.

Therefore, it is no limitation to the applicability if this invention of the following description of a preferred embodiment is based on a specific design, wherein some but not all above-mentioned functions are comprised on a single chip. Equally, designs can be conceived, wherein functions which are shown here on-chip could be changed by a person skilled in the art resulting in less on-chip functions as will be shown here.

Exemplary design problems of this kind are disclosed in the U.S. Pat. Nos. 5,454,114; 5,422,807 and 5,294,928 which broadly relate to CMOS semiconductors microcontrollers with on-chip A/D conversion capability, all of which are incorporated herein by reference.

Other design problems result from the conditions imposed on the design engineer in respect of chip space, processing speed and data throughput. One may choose an architecture which is simple and a VLSI microcircuit technology which is most compact and therefore quite economic as to chip space or one may wish to employ more complex circuitry requiring a larger chip area, but at the same time gaining higher processing speed and faster data throughput. Also in respect of these requirements, the microcontroller design engineer must find an appropriate balance.

It is the main object of this invention to increase the processing speed of a microcontroller module with a unidirectional bus architecture.

This and other objects are solved in an advantageous manner by the present invention.

SUMMARY OF THE INVENTION

According to embodiments of the present invention, a microcontroller is provided using RISC architecture having an accumulating ALU, a program counter, a stack, program memory, data memory, an address bus, a data bus, and clock input which receives a clock signal having alternating positive transitions and negative transitions. In one embodiment, the microcontroller comprises a data bus having a read bus which provides data from said data memory to said accumulating ALU, and a write bus which provides data from said accumulating ALU to said data memory; a timing control circuit which causes said accumulating ALU to write data to said data memory during each positive transition of said clock cycle, and read data from the data memory during each negative transition of said clock cycle. In another embodiment, the microcontroller further comprises a plurality of registers including a peripheral control register which receives data from said accumulating ALU via said write bus and provides data to said accumulating ALU via said read bus; and a bi-directional signal bus for providing data and control signals between said peripheral control register and a peripheral circuit.

BRIEF DESCRIPTION OF THE DRAWINGS

The above and other objects, features and attendant advantages of the present invention will become apparent from a consideration of the following description of an embodiment of the inventive microcontroller module taken in conjunction with the accompanying drawings, in which.

DETAILED DESCRIPTION OF THE INVENTION

Figure 1:
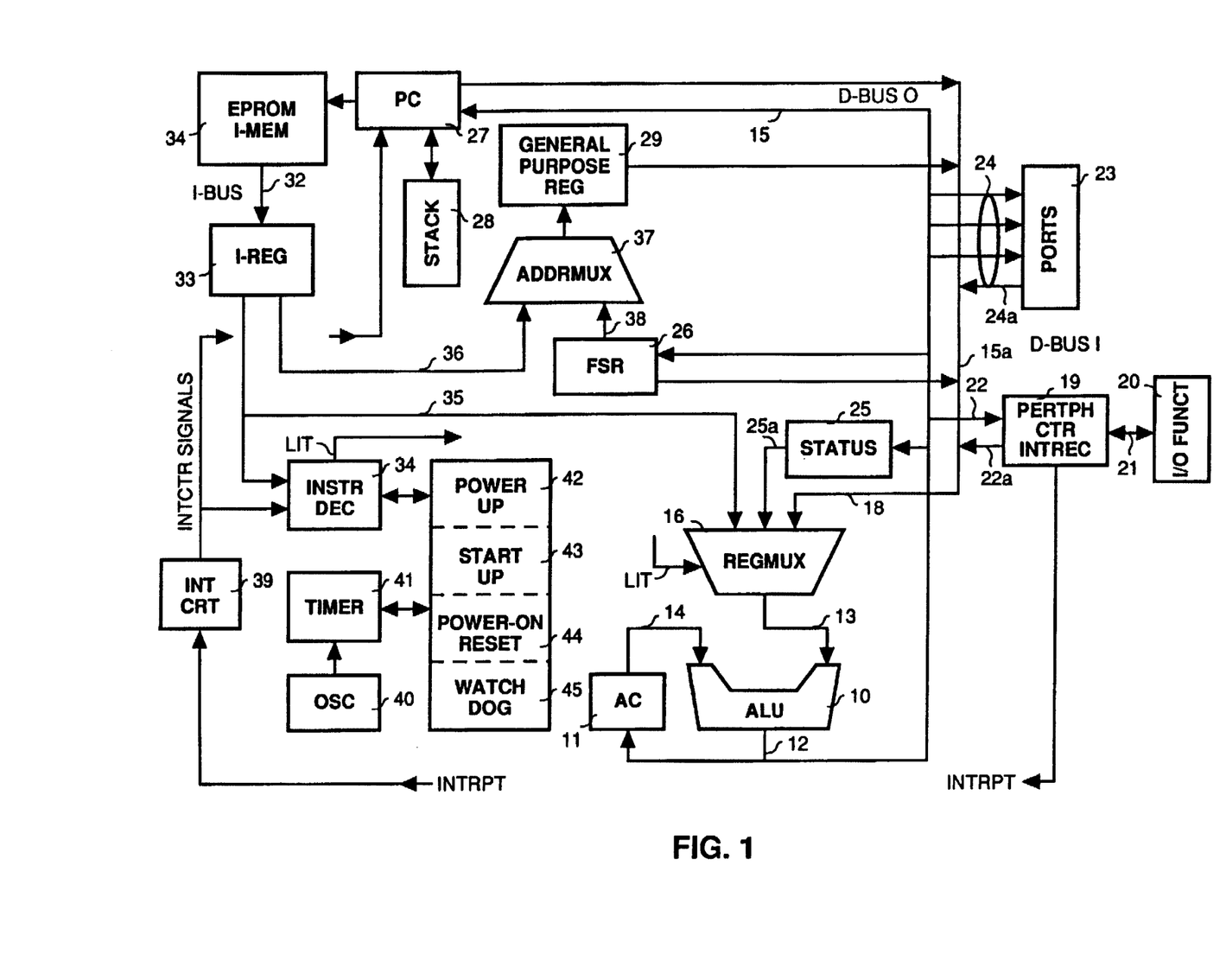
FIG. 1 is a block diagram of the overall microcontroller module incorporating the present invention.

With reference to FIG. 1, the invention will be described in the context of a high-performance EPROM-based 8-bit microcontroller employing RISC architecture with pipelined instruction processing.

In one embodiment, the microcontroller is fabricated in a CMOS semiconductor IC (=Integrated Circuit) chip which incorporates a CPU with an array of peripheral resources for performing complex real-time control applications. The features of the CPU preferably include fully static design; 8-bit wide data bus; variable bit width instructions (all, single word); single cycle instructions in most instances, and two cycle in others; addressable instruction memory space; direct, indirect (with auto increment and decrement), immediate and relative addressing; and four modes of operation including microcontroller mode (internal only instruction memory access), secure (code protected) microcontroller mode, extended microcontroller mode (both internal and external instruction memory access), and reduced microcontroller mode (external only instruction memory access).

Due to the high level of device integration, the single microcontroller chip also includes 32K in-chip EPROM instruction memory 31, 2K of general purpose registers in the RAM 29, special function registers, hardware stack 28, external/internal interrupts 39, I/O control functions 19, timer and counters 40, 41, capture registers, high speed outputs 22, 24 and a serial port with baud rate generator. Additional on-chip features include a watchdog timer with its own on-chip RC oscillator for reliable operation providing a device reset when the device finds itself in an endless loop; a power-saving sleep mode to turn the device off while it is not in use, thereby saving power; an on-chip power-up timer and power-on reset feature to reduce external circuitry; an on-chip oscillator start-up timer to provide time for the crystal oscillator to stabilize before the chip is allowed to run; code protection to allow the user to selectively protect portions of the instruction memory, and fuse selector oscillator options including standard crystal oscillator, low frequency crystal oscillator, and RC oscillator or external clocking.

The high performance which is achieved with this microcontroller is in part attributable to certain architectural features generally applied to RISC microcontrollers. Instruction and operational data flow is on separate buses and the instructions and operational data (operands) are accessed from separate memories referred to as instruction memory and data memory, respectively. Separating the instruction memory and data memory allows instructions to be sized on other than 8-bit wide data words. The microcontrollers uses 16-bit wide OP-codes, and thus this scheme makes single word instructions possible throughout as well as fetching a 16-bit wide instruction in a single cycle by a full 16-bit wide instruction memory access bus 32.

A two-stage pipeline overlaps fetch and execution of instructions. Consequently, the instructions normally execute in a single cycle. The only exceptions are program branches and special instructions to transfer data between instruction and data memories.

The microcontoller addresses 64K×16 instruction memory space and integrates 2K×16 EPROM instruction memory. Program execution can be performed in any one of the four microcontroller modes mentioned above. File registers providing the data memory locations (for example 256 such locations) are directly or indirectly addressed. Special function registers including the program counter (PC) are mapped in the data memory. Use of a substantially orthogonal (symmetrical) instruction set allows any operation to be carried out on any register using any addressing mode. The instructions which apply to the microcontroller of FIG. 1 can be the same as those which are listed in the instruction set of the device which is disclosed in U.S. Pat. No. 5,454,114, which is incorporated herein by reference.

The hard core of the microcontroller is the CPU comprising the ALU 10 and the accumulating ALU AC 11 which serves as a working register. Operation of the CPU is performed with unidirectional data buses (split data buses), i.e. there is a unidirectional data output bus 12 from ALU 10 to AC 11. The operands are supplied to the ALU 10 via a first unidirectional ALU input bus 13 (for data from the registers) and a second unidirectional ALU input bus 14 (for the results contained in AC 11).

How the ALU and AC cooperate in performing arithmetic and logical operations is well-known and described, for example, in the book of A. P. Speiser: Digitale Rechenanlagen, Springer Verlag, Berlin, pages 180 (FIG. 181), 197 (FIG. 191) and 201 (FIG. 293).

For data transport, the individual components of the microcontroller are coupled to and cooperating through an output data bus 15 and an input data bus 15a. Output data bus 15 provides the output from ALU 10 to individual components of the microcontroller such as ports 23, the peripheral control interface port 19, general purpose registers 29, and the program counter 27. Input data bus 15a provides data from the individual components to the register multiplexer 16 which in turn provides data to ALU 10.

The register multiplexer REGMUX 16 is coupled to the ALU 10 by unidirectional ALU input bus 13. In one embodiment, REGMUX has a plurality of unidirectional input connections, such as 25a and 35, supplying data from different registers for ALU processing. Connection 18 couples REGMUX 16 unilaterally to the input data bus 15a, and Connection 24a couples ports 23 to input data bus 15a. These connections will be discussed in more detail below.

The I/O functions 20 (such as A/D, communications and other I/O components) are coupled to the peripheral control interface 19 in a bi-directional mode through bus 21. Data is supplied to the peripheral control interface 19 from output data bus 15 unilaterally via bus 22. Data is then supplied to the REGMUX 16 from Peripheral Control 19 by Input data bus 15a which is coupled to the Peripheral Control 19 by connection 22a. Of course, those of skill in the art will recognize that embodiments of the invention are possible in which all registers are connected individually to the REGMUX 16. In this case, there would be no need for a separate Input data bus 15a. The bank of input/output ports 23 is similarly coupled to the Input and Output data buses via buses 24 and 24a.

Thus, according to versions of the invention, the data bus for providing information to and from the ALU is "split" into separate read and write data buses. This feature is seen in the connection of other microcontroller components as well. For example, the connection of the other microcontroller components such as status register 25, file select register FSR 26, and program counter PC 27 with stack 28, is also accomplished by use of input and output data busses.

The instruction transport buses generally operate in a unilateral mode. Instruction bus 32 couples the instruction memory EPROM 31 to the instruction register I-REG 33 which is coupled to the instruction decoder 34, and via connection 35 to the third input of REGMUX 16. If REGMUX 16 selects the signals from connection 35, the CPU (ALU 10 and AC 11) will perform logical operations on instructions supplied by the instruction register 33.

I-REG 33 is coupled through bus 36 to a first input of an address multiplexer ADDRMUX 37. A second input of ADDRMUX 37 receives via bus 38 addressing signals from the file select register FRS 26. ADDRMUX 37 selects the actual address data for accessing the general purpose registers of RAM 29. The data stored in the addressed locations of RAM 29 are supplied to the data bus 15a in the case of a read operation, or—in the case of a write operation—data from data bus 15 are written into and stored in the respective addressed locations.

The OP-code ("literals") signals provided by the instruction decoder INSTRDEC 34 are supplied to components wherever needed, for example, as LIT control signals to the ALU 10 to execute the desired arithmetical/logical operation.

Referring still to FIG. 1, there is shown another version of the invention in which the microcontroller comprises a peripheral control register which receives data from the ALU via the write bus and provides data to the ALU via the read bus. In this version, the peripheral control register comprises a bi-directional data bus for providing data and control signals between the peripheral control register and a peripheral circuit, such as a serial communications port. The architecture shown in this version is required due to the presence of the two-phase data bus. However, the bi-directional data bus between the register and the circuit will not adversely effect the timing of the two-phase clock which will be discussed infra.

Figure 2:
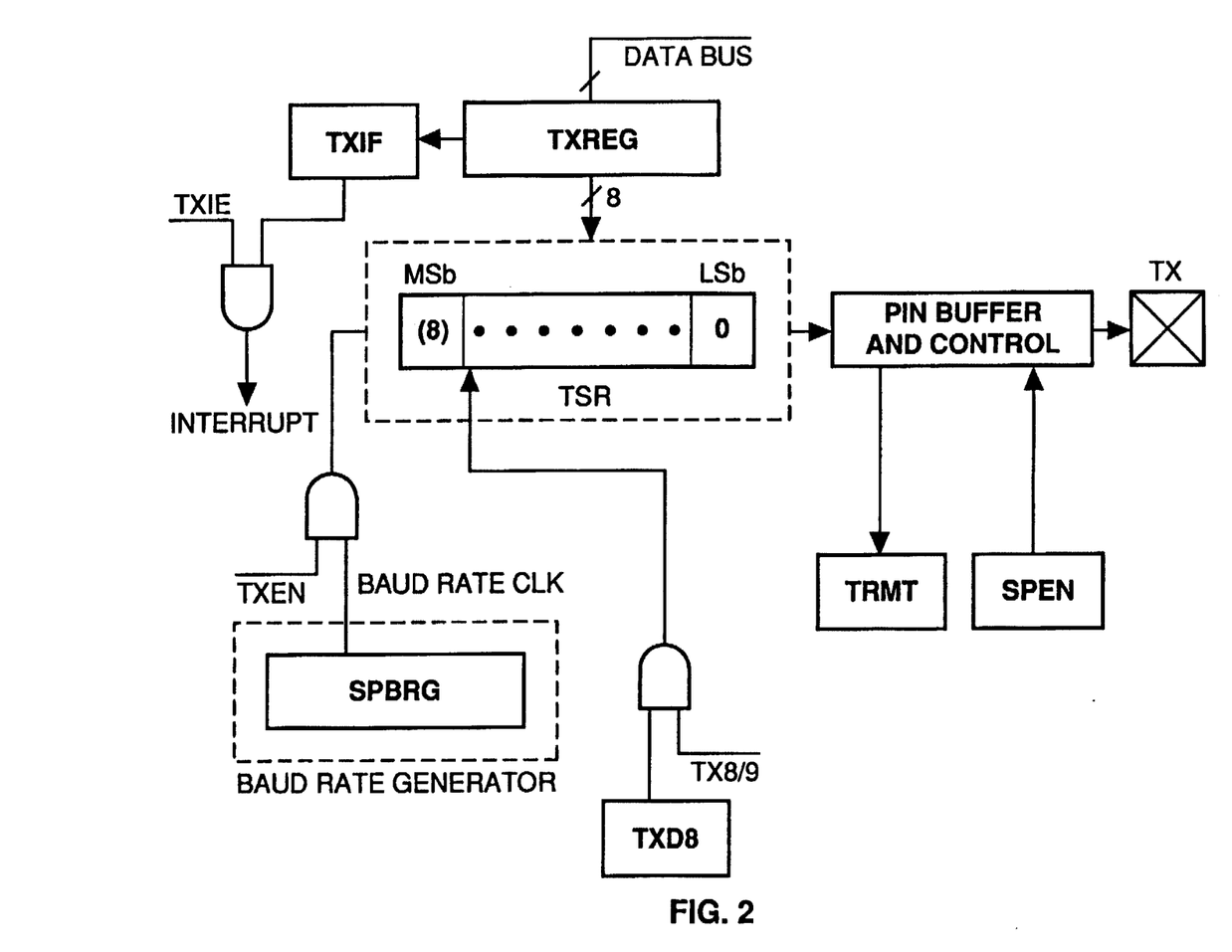
FIG. 2 is a schematic diagram of a serial communications transmitter circuit useful with the invention.
Figure 2A:
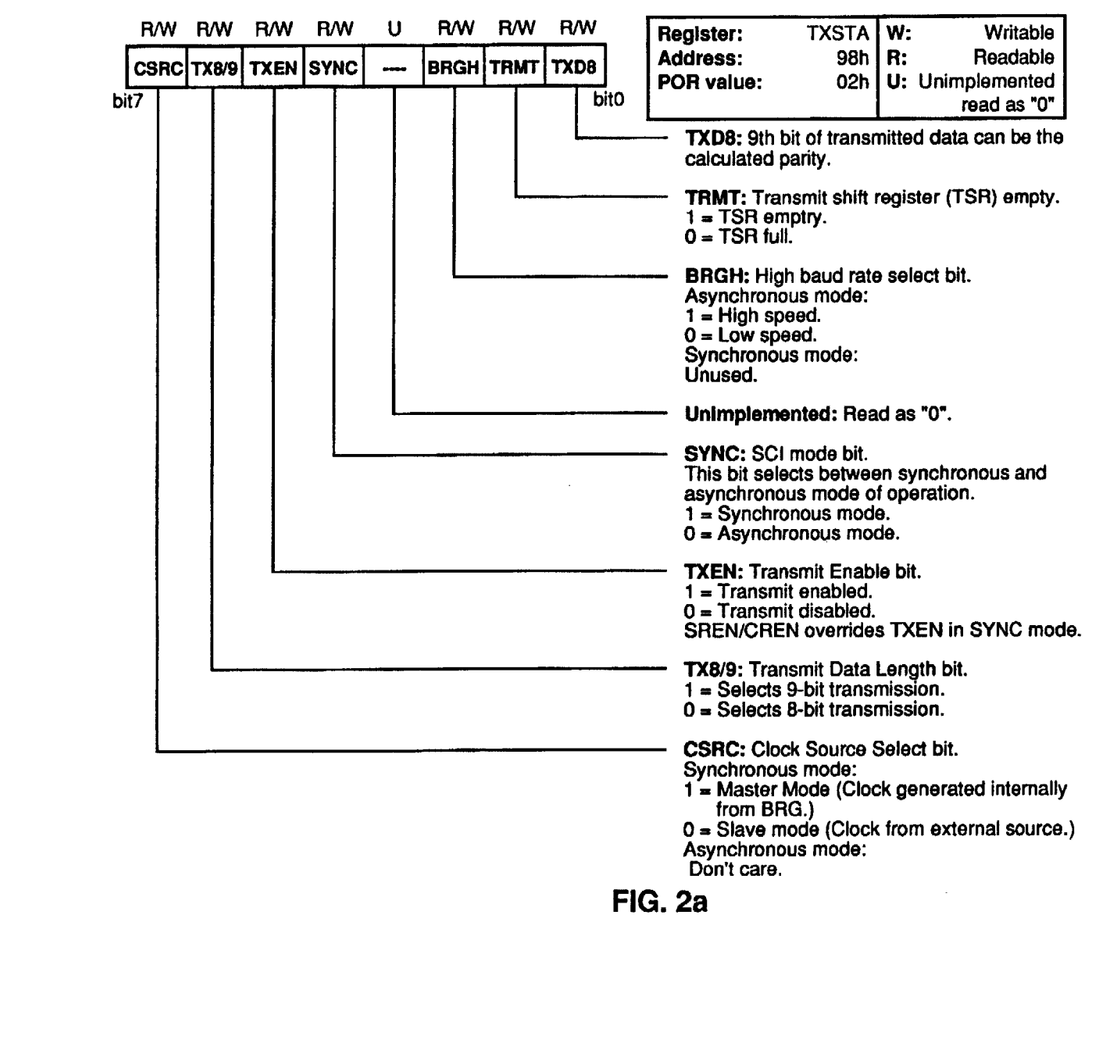
FIGS. 2A and 2B are registers useful with the transmitter shown in FIG. 2.
Figure 2B:
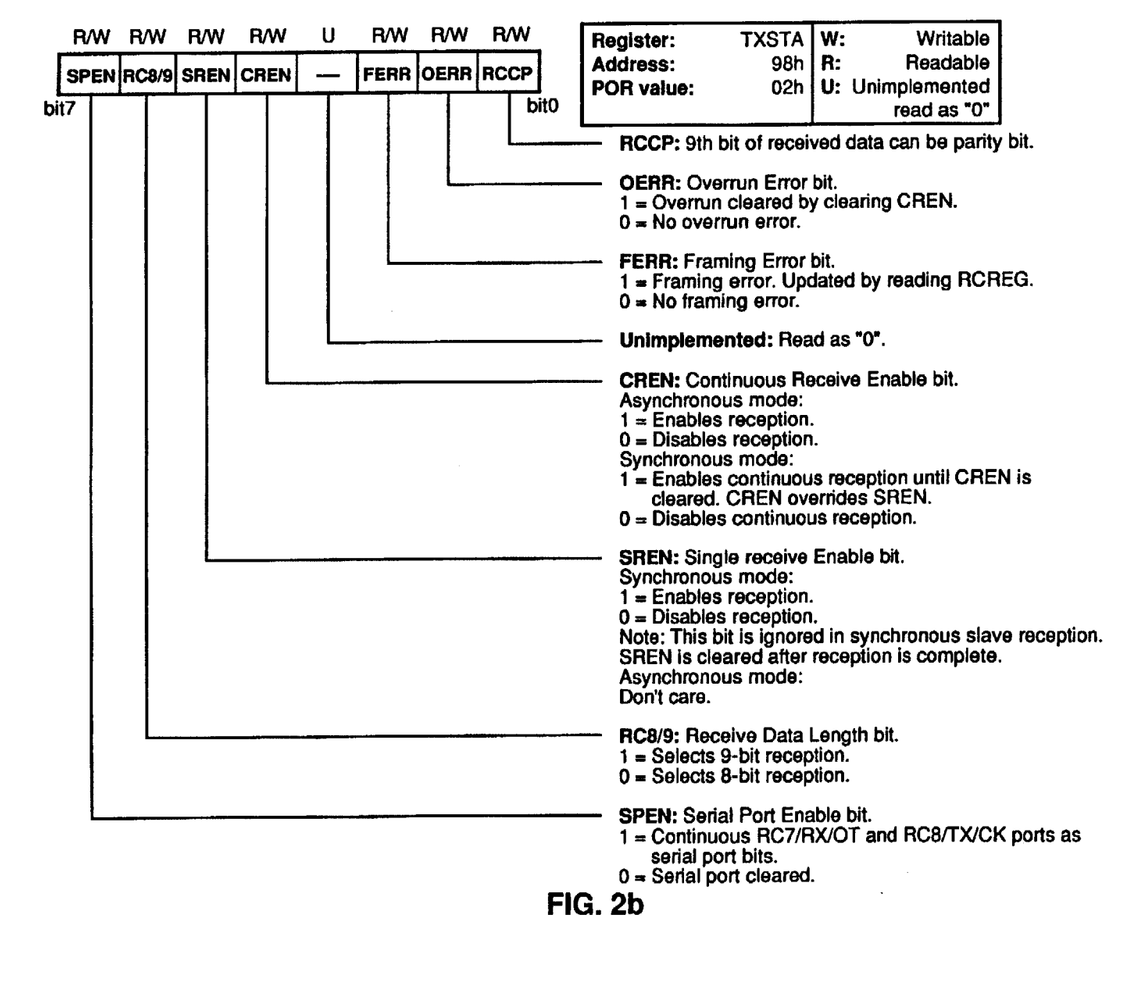

FIG. 2 shows a more specific version of the invention in which the peripheral circuit comprises a serial communication interface circuit. In this embodiment, the microcontroller is provided with a serial transmission circuit comprising a shift register TSR which obtains data from the transmit buffer TXREG. The circuit is provided with an interrupt signal which may be enabled or disabled by the TXIE signal. The serial signal is provided on pin TX. The remaining control signals are described in FIGS. 2A and 2B which show the bit pattern of registers required for correct operation of the circuit shown in FIG. 2. These are the transmit status and receive status control registers. Another register is the Baud rate register SPBRG used to calculate the transmission rate of the communications. Those of skill in the art will recognize that other circuits are useful with the present invention and that a serial communications receiver circuit would operate in similar fashion. However, for correct interface, it is important to note that the data bus is not bi-directional, as with traditional RISC architecture, but a unidirectional bus such as output bus 15.

Figure 3A:
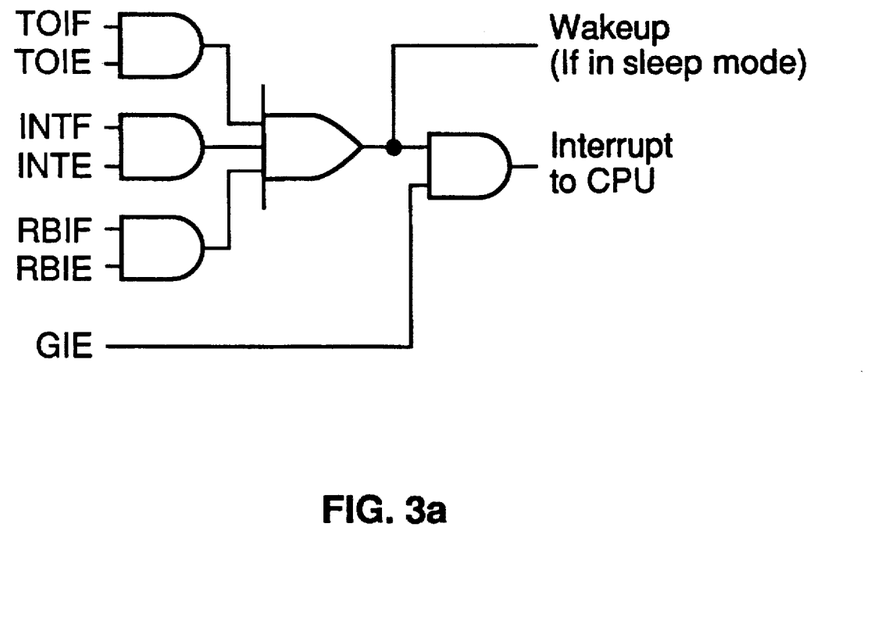
FIG. 3A is a schematic diagram of an interrupt control circuit useful with the invention.
Figure 3B:
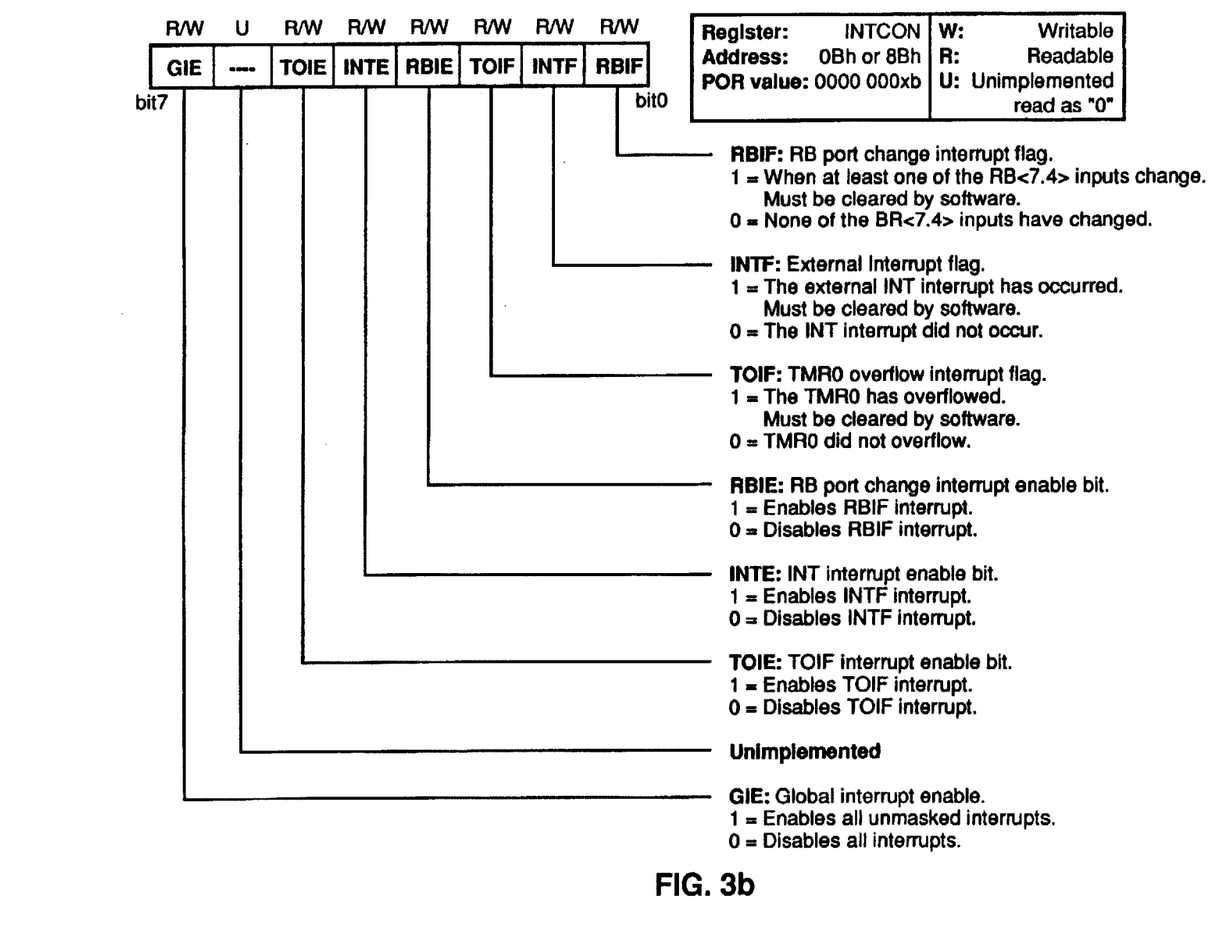
FIG. 3B is a block diagram of a register useful with the interrupt control circuit shown in FIG. 3A.

The microcontroller is also capable of handling interrupts. Interrupts are generally caused by peripheral units, such as I/O device 20. The interrupt signals INTRPT are generated by the peripheral control interface 19. These INTRPT signals are supplied to the interrupt control unit INTCTR 39, which supplies interrupt handling control signals INTCTR to the instruction decoder INSTRDEC 34 and also to the program counter PC 27. FIGS. 3A and 3B show an example of an interrupt circuit and interrupt registers useful with the present invention. Referring to FIG. 3B, the registers comprise a plurality of flag bits which are used by the ALU in processing and determining the source of interrupts. The specific operation of the register and the description of the bits have been taken from the PIC 16/17 microcontroller databook which has been incorporated by reference. However, this is only an example of one useful version, and other possibilities will occur to those of skill in the art. FIG. 3B shows an example of a circuit useful to provide interrupts to the microcontroller. Again, this is only one specific embodiment taken from the above mentioned databook. The interrupt processing may be handled in usual ways such as pushing the PC onto the stack and loading the interrupt vector into the PC.

The clock oscillator OSC 40 and timing circuitry 41 provide timing and clock signals and sequences throughout the microcontroller wherever needed. This is not specifically shown in FIG. 1 for not overloading the block diagram with timing signal lines. It is, however, schematically shown that the components power-up timer 42, oscillator start-up timer 43, power-on reset 44 and watchdog timer 45 are bi-directionally linked with the interrupt control unit INTCTR 39 and with the timing circuitry 41.

Figure 4A:
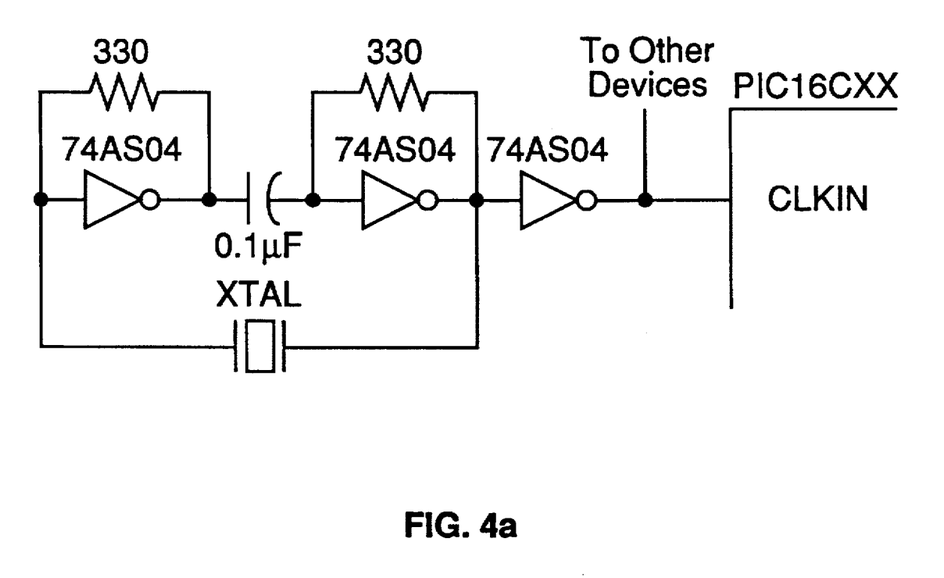
FIGS. 4A–4C are schematic diagrams of clock circuits useful with the invention.
Figure 4B:
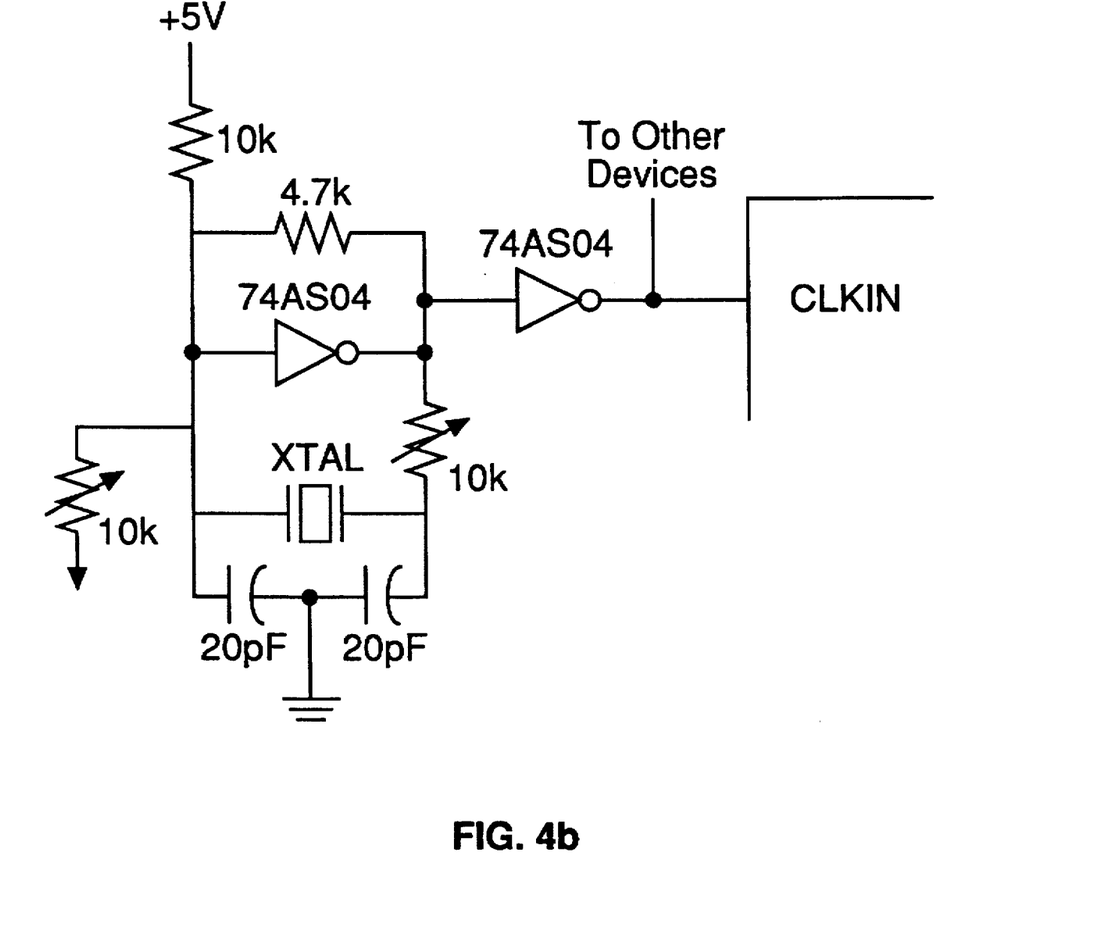
Figure 4C:
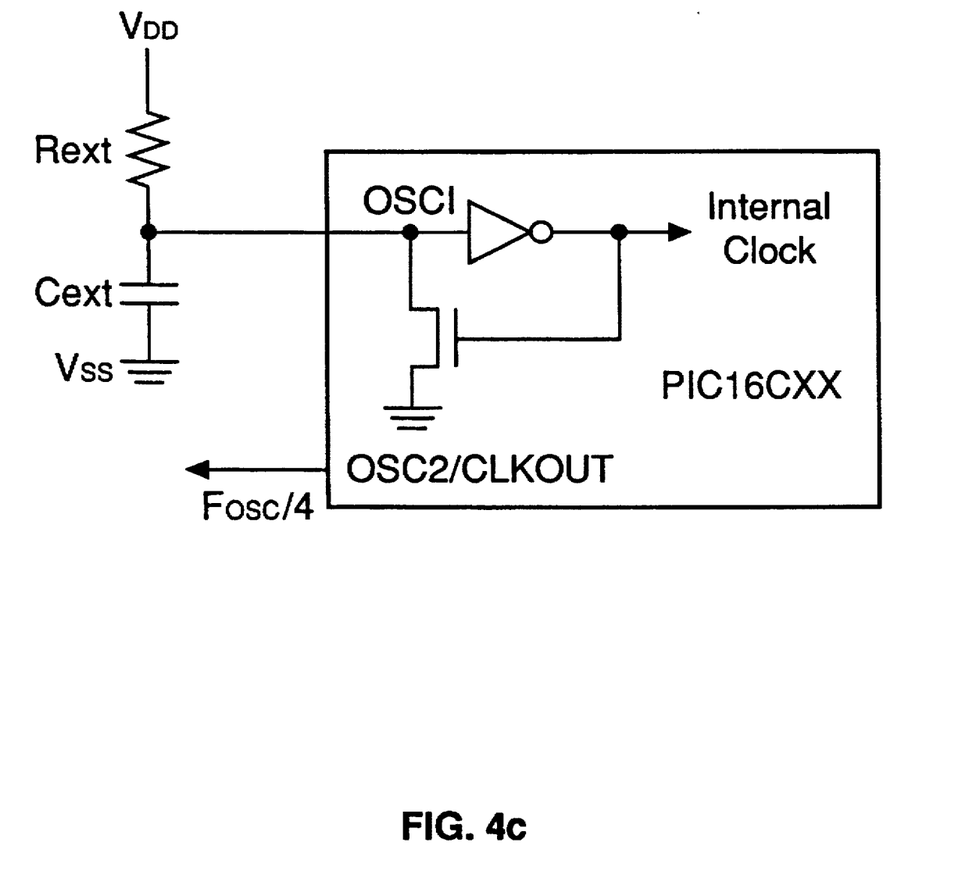

FIGS. 4A–4C show examples of oscillator circuits useful with this invention. It should be noted that in the watchdog timer, the clock used is independent of the system clock. An RC oscillator is useful in this version. The same is also true for the start-up timers. In still further versions of the invention, circuits are provided for adding external crystal oscillators which provide even more precise timing than could be provided by RC oscillators.

Additionally, versions of the invention are provided in which a power-down circuit is used to stop the negative and positive transitions of the system clock. This allows the device to be placed in a low power mode to preserve battery life in the battery operated applications.

By providing the microcontroller with separate read and write data buses, rather than a bi-directional data bus as used in, for example, the PIC16C5X discussed previously, it is possible to obtain significant processing speed increases. The reasons for this are discussed below.

Figure 5:
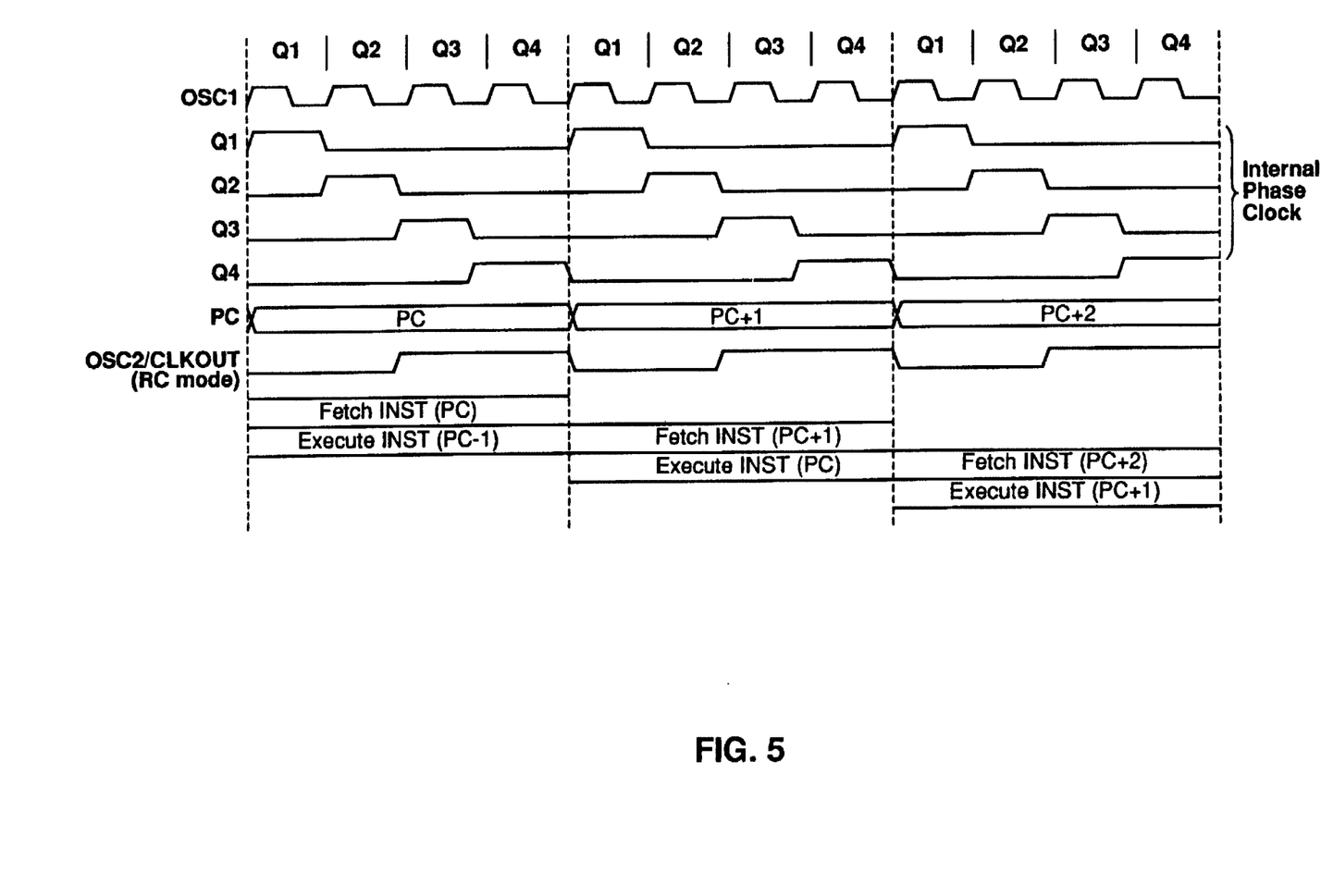
FIG. 5 is a timing diagram of a typical RISC device.

In the common bi-directional data bus architecture, timing must be provided for the ALU to latch a fetched instruction into the register, read data memory, execute the instruction and write memory. FIG. 5 shows an example of a typical timing scheme commonly used in RISC microcontrollers. This timing scheme is used in the PIC16C5X which is representative of the timing found in other common RISC architectures. As shown, each instruction cycle requires four clock cycles Q to operate.

Of course, it is understood that if an instruction could be executed in less than four clock cycles, there would be a corresponding increase in through-put for the controller operating at a given clock frequency. Although a number of events take place during these four cycles, it should be noted that one reason the number of clock cycles required per instruction cycle is due to the use of a bi-directional data bus. Specifically, the controller must have sufficient time to "switch" the direction of the data bus from read to write, and vice versa. Thus, with the traditional bi-directional bus architecture, there will always be a minimum number of clock cycles required per instruction cycle.

This problem is solved in the present invention by the use of separate read and write data buses. Although this architecture adds to the size of the microcontroller, it allows the two-phase clocking scheme shown in FIG. 6.

Figure 6:
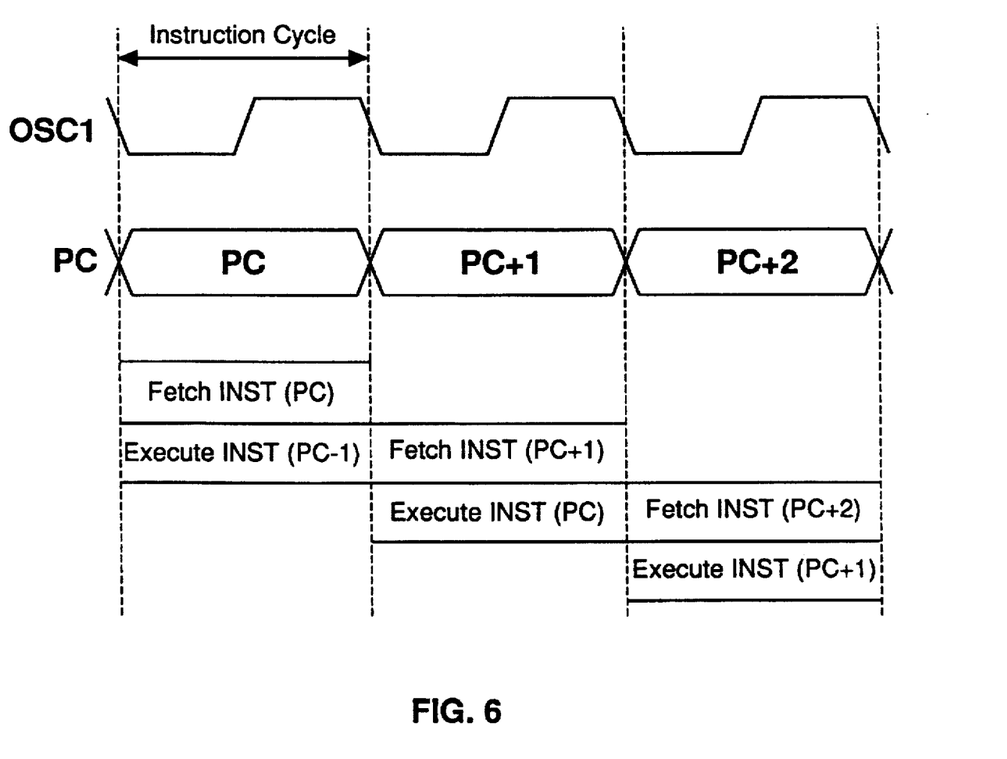
FIG. 6 is a timing diagram of an embodiment of the invention.

In this case, the ALU is designed to read data from the data memory during the negative transition of the clock OSC1, and write data to the memory during the positive transition. Thus, the controller of the present invention is able to read and write to memory in one clock cycle. This enables a controller according to the present invention to obtain a 4X increase in throughput compared to traditional RISC microcontrollers using a bi-directional data bus.

Of course, this increase in throughpro is obtained at the expense of a certain amount of duplication of logic and increase in chip size, but in applications requiring highest obtainable processing speed, the trade off is more than justified.

Figure 7:
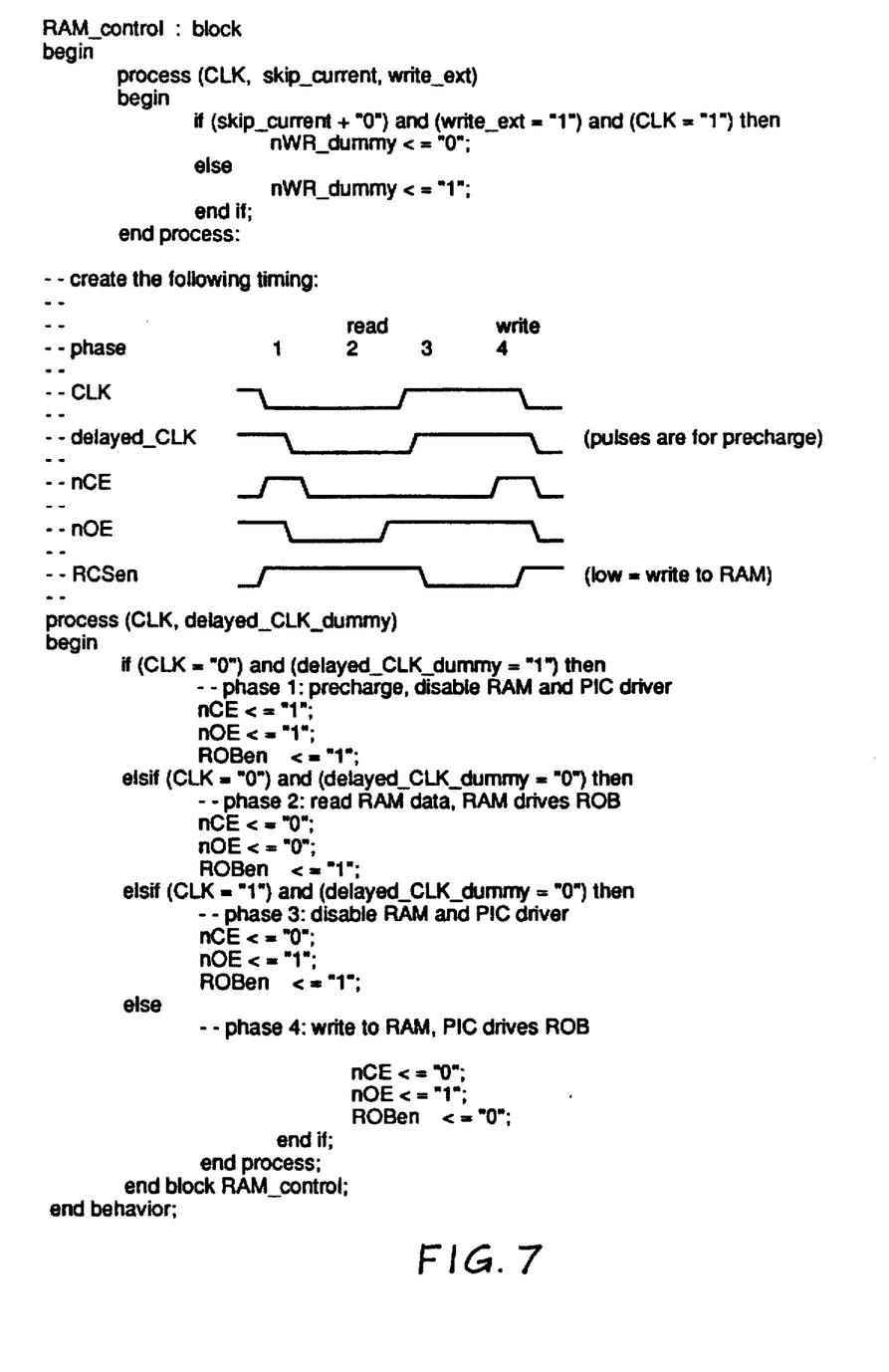
FIG. 7 is an example of HDL code useful with the present invention.

In another version of the invention, the present microcontroller architecture is implemented in a "sea-of-gates" environment. The present architecture is particularly suited to implementation in a sea-of-gates version because the two-phase clocking scheme combined with separate read and write data buses lends itself to simple Hardware Description Language ("HDL") programming. Once the HDL is developed, then implementation is a matter of choosing the desired circuit libraries. FIG. 7 shows an example of HDL code language useful for defining the two-phase clock according to the present invention. It should be noted that, since that number of clock cycles per instruction has been reduced, RAM precharging pulses nCE are provided, although they are not needed for actual timing.

What is claimed is:

1. A microcontroller using RISC architecture having an accumulating ALU, a program counter, a stack, program memory, data memory, an address bus, and clock input which receives a clock signal having alternating positive transitions and negative transitions, the microcontroller comprising:

a data bus comprising a read bus which provides data from said data memory to said accumulating ALU, and a write bus which provides data from said accumulating ALU to said data memory;

a timing control circuit which causes said accumulating ALU to write data to said data memory during each positive transition of said clock signal, and read data from the data memory during each negative transition of said clock signal;

a peripheral control register which receives data from said accumulating ALU via said write bus and provides data to said accumulating ALU via said read bus; and a bi-directional signal bus for providing data and control signals between said peripheral control register and a peripheral circuit.

2. A microcontroller as in claim 1, wherein said peripheral circuit comprises a serial communication interface circuit, said serial communication interface circuit being responsive to a transmit status and control register, a receive status and control register, and a Baud rate register.

3. A microcontroller as in claim 1, wherein said peripheral circuit comprises an analog to digital converter circuit, said analog to digital converter circuit being responsive to an A/D result register, an A/D control register 0, and an A/D control register 1.

4. A microcontroller as in claim 1, further comprising:

an interrupt control register having a plurality of flag bit, each flag bit being responsive to an interrupt signal;

an interrupt control circuit, responsive to said flag bits of said interrupt control register, which causes data from said program counter to be pushed onto said stack and loads an interrupt vector into said program counter.

5. A microcontroller as in claim 1, further comprising a watchdog timer having an RC oscillator which provides a first timing signal, said first timing signal being independent of said clock signal, wherein said watchdog timer generates a reset signal to said microcontroller after the lapse of a predetermined time-out period.

6. A microcontroller as in claim 1, further comprising a power-down circuit which stops said positive and negative transitions of said clock signal and places said microcontroller into a low power consumption mode.

7. A microcontroller as in claim 1, further comprising a start-up timer, said start-up timer having an RC oscillator which provides a second timing signal, said second timing signal being independent from said clock signal, wherein said start-up timer provides a reset signal to said microcontroller for a predetermined time period after power is applied to said microcontroller.

8. A microcontroller as in clam 1 further wherein said timing circuit further comprises an input for receiving a signal from a crystal oscillator circuit.

* * * * *